United States Patent
Karikari et al.

(10) Patent No.: US 11,485,873 B2
(45) Date of Patent: Nov. 1, 2022

(54) COLD WATER SOLUBLE POLYMER FILMS FOR PACKAGING HIGHLY ALKALINE DETERGENTS

(71) Applicants: Rohm and Haas Company, Collegeville, PA (US); Dow Global Technologies LLC, Midland, MI (US)

(72) Inventors: Afua Sarpong Karikari, Bristol, PA (US); Michael C. Mitchell, Norristown, PA (US); Marianne Creamer, Warrington, PA (US); Nilesh Shah, Maple Glen, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 407 days.

(21) Appl. No.: 16/629,370

(22) PCT Filed: Jun. 19, 2018

(86) PCT No.: PCT/US2018/038143
§ 371 (c)(1),
(2) Date: Jan. 8, 2020

(87) PCT Pub. No.: WO2019/018092
PCT Pub. Date: Jan. 24, 2019

(65) Prior Publication Data
US 2021/0130519 A1 May 6, 2021

Related U.S. Application Data

(60) Provisional application No. 62/534,248, filed on Jul. 19, 2017.

(51) Int. Cl.
| | | |
|---|---|---|
| C09D 133/08 | (2006.01) | |
| C08F 220/18 | (2006.01) | |
| C08F 220/28 | (2006.01) | |
| C08F 18/02 | (2006.01) | |
| C08F 220/06 | (2006.01) | |
| C08F 220/14 | (2006.01) | |
| C08F 220/20 | (2006.01) | |
| C08L 39/06 | (2006.01) | |
| C08L 71/02 | (2006.01) | |
| C11D 17/04 | (2006.01) | |

(52) U.S. Cl.
CPC ............ C09D 133/08 (2013.01); C08F 18/02 (2013.01); C08F 220/06 (2013.01); C08F 220/14 (2013.01); C08F 220/1802 (2020.02); C08F 220/1804 (2020.02); C08F 220/1818 (2020.02); C08F 220/20 (2013.01); C08F 220/286 (2020.02); C08L 39/06 (2013.01); C08L 71/02 (2013.01); C11D 17/043 (2013.01); C08L 2203/162 (2013.01); C08L 2205/025 (2013.01); C08L 2205/035 (2013.01)

(58) Field of Classification Search
None
See application file for complete search history.

(56) References Cited

U.S. PATENT DOCUMENTS

| | | | | |
|---|---|---|---|---|
| 3,892,905 A | * | 7/1975 | Albert | ..................... C08L 29/04 206/0.5 |
| 4,528,360 A | * | 7/1985 | Fujita | ................... C08G 63/668 528/297 |
| 5,316,688 A | | 5/1994 | Gladfelter et al. | |
| 5,429,874 A | | 7/1995 | VanPutte | |
| 6,166,117 A | | 12/2000 | Miyazaki | |
| 6,228,920 B1 | * | 5/2001 | Topolkaraev | ............ C08J 3/005 524/378 |
| 7,745,517 B2 | | 6/2010 | Vicari et al. | |
| 8,728,593 B2 | | 5/2014 | Vicari et al. | |
| 10,590,249 B2 | * | 3/2020 | Karikari | .................. C08L 33/06 |
| 2007/0281003 A1 | * | 12/2007 | Fuisz | ..................... A61K 9/006 424/443 |
| 2014/0110301 A1 | | 4/2014 | Carrier et al. | |

FOREIGN PATENT DOCUMENTS

| | | | | |
|---|---|---|---|---|
| EP | 0513692 | | 11/1992 | |
| JP | 2004331818 | | 11/2004 | |
| WO | 199700282 | | 1/1997 | |
| WO | WO-9700282 A1 | * | 1/1997 | ............. B65D 65/46 |
| WO | 2014066339 | | 5/2014 | |
| WO | 2017058405 | | 4/2017 | |
| WO | WO-2017058405 A1 | * | 4/2017 | ................ C08J 5/18 |

* cited by examiner

Primary Examiner — Satya B Sastri
(74) Attorney, Agent, or Firm — Kenneth Crimaldi

(57) ABSTRACT

A film:
(a) 50 to 85 wt % polymer comprising:
(i) 30 to 70 wt % hard polymer with $T_g$ from 40 to 70° C. and 40 to 80 wt % ($C_1$-$C_{10}$)alkyl (meth)acrylate; 10 to 40 wt % $C_3$-$C_8$ carboxylic acid; and 0 to 25 wt % hydroxyalkyl (meth)acrylate; and
(ii) 30 to 70 wt % soft polymer with $T_g$ from −20 to 20 ° C. and 50 to 90 wt % ($C_1$-$C_{10}$)alkyl (meth)acrylate; 5 to 30 wt % $C_3$-$C_8$ carboxylic acid; and 0 to 25 wt % hydroxyalkyl (meth)acrylate;
hard $T_g$ minus soft $T_g$ is at least 30° C.;
(iii) 0 to 10 wt %, of ($C_{12}$-$C_{24}$)alkyl (meth)acrylate polymer containing crystallizable portion with $T_m$ from 0° C. to 37° C.;
(b) 10 to 40 wt % of polyethylene oxide having $M_w$ from 250,000 to 4,000,000; and
(c) 0 to 10 wt % of poly(vinylpyrrolidone) having $M_w$ from 25,000 to 2,000,000.

3 Claims, No Drawings

COLD WATER SOLUBLE POLYMER FILMS FOR PACKAGING HIGHLY ALKALINE DETERGENTS

This invention relates to a water soluble film containing an acrylic acid copolymer, and to detergent packets containing the water soluble film as an encasing material.

The practice of packaging household and automatic dish detergents in water soluble polyvinyl acetate vinyl alcohol (PVOH) films is common to reduce exposure of the end user to detergent ingredients. Current PVOH films commonly used for packaging soluble unit dose (SUD) detergents however have deficiencies that limits their use in packaging aggressive and caustic detergents used in industrial and institutional warewashing applications. Such deficiencies include poor chemical resistance of the PVOH films to caustic chemicals or highly alkaline detergent or soaps with a pH greater than 10.5, agricultural chemicals such as pesticides and fertilizers, and other materials which can aggressively attack the PVOH. U.S. Pat. No. 7,745,517 discloses a PVOH/AMP-functionalized unit dose packaging film that also contains dextrose, which acts as a chlorine scavenging agent. There remains a need for water soluble films having better resistance to high pH solids or liquids.

The problem addressed by this invention is the need for water-soluble films and packets or pouches for highly alkaline industrial and institutional automatic dishwasher and laundry detergent formulations.

STATEMENT OF INVENTION

The present invention provides a water soluble film. The water soluble film comprises:
(a) 50 to 85 wt %, based on weight of said film, of an acrylic polymer blend comprising:
  (i) 30 to 70 wt %, based on weight of said blend, of a hard polymer with a glass transition temperature ("$T_g$") from 40 to 70° C. and comprising polymerized units of: 40 to 80 wt % of at least one ($C_1$-$C_{10}$)alkyl (meth)acrylate; 10 to 40 wt % of at least one $C_3$-$C_8$ monoethylenically unsaturated monocarboxylic acid monomer or ethylenically unsaturated dicarboxylic acid monomer; and 0 to 25 wt % of least one hydroxyalkyl (meth)acrylate, based on total weight of the hard polymer;
  (ii) 30 to 70 wt %, based on weight of said blend, of a soft polymer with a $T_g$ from −20 to 20° C. and comprising polymerized units of: 50 to 90 wt % of at least one ($C_1$-$C_{10}$)alkyl (meth)acrylate; 5 to 30 wt % of at least one $C_3$-$C_8$ monoethylenically unsaturated monocarboxylic acid monomer or ethylenically unsaturated dicarboxylic acid monomer; and 0 to 25 wt % of at least one hydroxyalkyl (meth)acrylate, based on total weight of the soft polymer; wherein $T_g$ of the hard polymer minus $T_g$ of the soft polymer is at least 30° C., and
wherein at least a portion of the carboxylic acid groups on the hard polymer or the soft polymer, or both the hard polymer and the soft polymer, are neutralized; and
  (iii) 0 to 10 wt %, based on weight of said blend, of at least one ($C_{12}$-$C_{24}$)alkyl (meth)acrylate which are polymers containing crystallizable side chains with a melting temperature ($T_m$) of from about 0° C. to about 37° C.;
(b) 10 to 40 wt %, based on weight of said film, of a polyethylene oxide having $M_w$ from 250,000 to 4,000,000; and
(c) 0 to 10 wt %, based on weight of said film, of a poly(vinylpyrrolidone) having $M_w$ from 25,000 to 2,000,000.

The present invention further provides a detergent packet. The detergent packet comprises: (a) a detergent formulation comprising from 0 to 10 wt % surfactants; (b) from 0 to 25 wt % silicate salts; (c) from 20 to 80 wt % water; (d) from 20 to 80 wt % of at least one inorganic base and (e) a package encasing the detergent formulation, wherein the package comprises a water soluble film as described herein.

DETAILED DESCRIPTION

Percentages are weight percentages (wt %) and temperatures are in ° C., unless specified otherwise. Operations were performed at room temperature (20-25° C.), unless specified otherwise. The term "(meth)acrylic" means methacrylic or acrylic and "(meth)acrylate" means methacrylate or acrylate. Percentages of monomer units in a polymer are percentages of solids or neat monomer weight, i.e., excluding any water present in a polymer emulsion, and are based on the total weight of the polymer (determined from the total weight of the monomers from which the polymer is comprised).

"Glass transition temperature" or "$T_g$" refers to the temperature at or above which a glassy polymer will undergo segmental motion of the polymer chain. Glass transition temperatures of a polymer can be estimated by the Fox equation (*Bulletin of the American Physical Society*, 1 (3) Page 123 (1956)) as follows:

$$1/T_g = w_1/T_{g(1)} + w_2/T_{g(2)}$$

For a copolymer, $w_1$ and $w2$ refer to the weight fraction of the two comonomers, and $T_{g(1)}$ and $T_{g(2)}$ refer to the glass transition temperatures of the two corresponding homopolymers made from the monomers. For polymers containing three or more monomers, additional terms are added ($w_n/T_{g(n)}$). The $T_{(g)}$ of a polymer can also be calculated by using appropriate values for the glass transition temperatures of homopolymers, which may be found, for example, in "Polymer Handbook," edited by J. Brandrup and E. H. Immergut, Interscience Publishers. The $T_g$ of a polymer can also be measured by various techniques, including, for example, differential scanning calorimetry ("DSC"). The values of $T_g$ reported herein are measured by DSC.

The "Melting temperature" or "$T_m$" is a function of crystallinity. The use of a differential scanning calorimeter (DSC) is a popular method for examining the melting transition and is used for the determination of the $T_m$ in the present invention.

As used herein, $M_w$ refers to the weight average molecular weight as measured in a conventional manner with gel permeation chromatography (GPC) and polyacrylic acid standards. GPC techniques are discussed in detail in Modem Size Exclusion Chromatography, W. W. Yau, J. J. Kirkland, D. D. Bly; Wiley-lnterscience, 1979, and in A Guide to Materials Characterization and Chemical Analysis, J. P. Sibilia; VCH, 1988, p.81-84. Molecular weights are reported herein in units of Daltons.

Preferably, the polymer films are sealed to form a closed pouch, preferably one containing a cleaning formulation or a laundry detergent, preferably a laundry detergent.

Preferably, an "acrylic polymer" is a polymer having at least 70 wt % acrylic monomers, preferably at least 80 wt %, preferably at least 90 wt %, preferably at least 95 wt %. Acrylic monomers include (meth)acrylic acids, their salts and their $C_1$-$C_{22}$ alkyl or hydroxyalkyl esters; crotonic acid, itaconic acid, fumaric acid, maleic acid, maleic anhydride, (meth)acrylamides, (meth)acrylonitrile and alkyl or hydroxyalkyl esters of crotonic acid, itaconic acid, fumaric acid or maleic acid. The acrylic polymer may also comprise other polymerized monomer residues including, e.g., non-ionic (meth)acrylate esters, cationic monomers, monounsaturated dicarboxylates, vinyl esters of $C_1$-$C_{22}$ alkyl carboxylic acids, vinyl amides (including, e.g., N-vinylpyrrolidone), sulfonated acrylic monomers, vinyl sulfonic acid, vinyl halides, phosphorus-containing monomers, heterocyclic monomers, styrene and methyl-substituted styrenes.

Preferably, $T_g$ of the hard polymer is at least 45° C.; preferably no more than 65° C., preferably no more than 60° C. Preferably, $T_g$ of the soft polymer is at least −15° C., preferably at least −10° C.; preferably no more than 5° C., preferably no more than 10° C., preferably no more than 15° C. Preferably, $T_g$ of the hard polymer minus $T_g$ of the soft polymer is at least 40° C., preferably at least 50° C.

The acrylic polymer blend may be a mixture of two or more polymers or a multi-stage polymer. Preferably, a multi-stage polymer has a first stage polymer which is a soft polymer and a second stage polymer which is a hard polymer. Preferably, $M_w$ of the multi-stage polymer is from 40,000 to 500,000; preferably at least 70,000, preferably at least 90,000; preferably no more than 400,000, preferably no more than 300,000, preferably no more than 200,000. Preferably, the acrylic polymer blend comprises at least 35 wt % of the hard polymer, preferably at least 40 wt %, preferably at least 45 wt %, preferably at least 50 wt %; preferably no more than 67 wt %, preferably no more than 64 wt %. Preferably, the acrylic polymer blend comprises at least 33 wt % of the soft polymer, preferably at least 36 wt %; preferably no more than 60 wt %, preferably no more than 55 wt %, preferably no more than 50 wt %.

Preferably, the hard polymer comprises at least 50 wt % polymerized units of $C_1$-$C_{10}$ alkyl (meth)acrylate monomers, preferably at least 55 wt %, preferably at least 60 wt %, preferably at least 63 wt %; preferably no more than 77 wt %, preferably no more than 74 wt %. Preferably, the hard polymer comprises at least 12 wt % polymerized units of at least one $C_3$-$C_8$ monoethylenically unsaturated monocarboxylic acid monomer or ethylenically unsaturated dicarboxylic acid monomer, preferably at least 14 wt %; preferably no more than 35 wt %, preferably no more than 30 wt %, preferably no more than 25 wt %, preferably no more than 22 wt %. Preferably, the hard polymer comprises at least 3 wt % polymerized units of at least one $C_2$-$C_4$ hydroxyalkyl (meth)acrylate, preferably at least 6 wt %, preferably at least 8 wt %; preferably no more than 20 wt %, preferably no more than 15 wt %, preferably no more than 12 wt %. Preferably, the hard polymer further comprises 0 to 10 wt % polymerized units of at least one $C_{12}$-$C_{20}$ alkyl (meth)acrylate monomer; preferably at least 1 wt %, preferably at least 2 wt %; preferably no more than 8 wt %, preferably no more than 6 wt %, preferably no more than 5 wt %.

Preferably, the soft polymer comprises at least 55 wt % polymerized units of $C_1$-$C_{10}$ alkyl (meth)acrylate monomers, preferably at least 60 wt %, preferably at least 65 wt %; preferably no more than 85 wt %, preferably no more than 80 wt %, preferably no more than 75 wt %. Preferably, the soft polymer comprises at least 7 wt % polymerized units of at least one $C_3$-$C_8$ monoethylenically unsaturated monocarboxylic acid monomer or ethylenically unsaturated dicarboxylic acid monomer, preferably at least 8 wt %; preferably no more than 25 wt %, preferably no more than 20 wt %, preferably no more than 15 wt %, preferably no more than 12 wt %. Preferably, the soft polymer comprises at least 4 wt % polymerized units of at least one $C_2$-$C_4$ hydroxyalkyl (meth)acrylate, preferably at least 7 wt %, preferably at least 10 wt %; preferably no more than 22 wt %, preferably no more than 20 wt %, preferably no more than 18 wt %. Preferably, the soft polymer further comprises 0 to 10 wt % polymerized units of at least one polyethylene mono-alkyl ether (meth)acrylate; preferably at least 1 wt %, preferably at least 2 wt %, preferably at least 3 wt %; preferably no more than 8 wt %, preferably no more than 7 wt %.

Preferably, the $C_3$-$C_8$ monoethylenically unsaturated carboxylic acid monomers are (meth)acrylic acids. Preferably, the $C_1$-$C_{10}$ alkyl (meth)acrylate monomers are $C_1$-$C_4$ alkyl (meth)acrylate monomers. Preferably, each of the soft and hard polymers comprises from 10 to 40 wt % polymerized units of $C_4$ alkyl acrylate monomers (preferably n-butyl acrylate); preferably at least 15 wt %; preferably no more than 35 wt %, preferably no more than 30 wt %. Preferably, the soft polymer comprises from 55 to 85 wt % polymerized units of $C_1$-$C_4$ alkyl acrylate monomers (preferably $C_2$-$C_4$); preferably at least 60 wt %, preferably at least 63 wt %; preferably no more than 80 wt %, preferably no more than 77 wt %. Preferably, the hard polymer comprises from 30 to 60 wt % polymerized units of $C_1$-$C_2$ alkyl methacrylate monomers (preferably methyl methacrylate); preferably at least 35 wt %, preferably at least 38 wt %; preferably no more than 55 wt %, preferably no more than 50 wt %.

Preferably, the polyethylene oxide has $M_w$ of at least 300,000, preferably at least 350,000; preferably no more than 1,000,000, preferably no more than 700,000. Preferably, the poly(vinylpyrrolidone) has $M_w$ of at least 50,000, preferably at least 100,000, preferably at least 500,000, preferably at least 800,000; preferably no more than 1,700,000, preferably no more than 1,500,000.

Preferably, the film comprises at least 1 wt % poly(vinylpyrrolidone), preferably at least 2 wt %, preferably at least 3 wt %; preferably no more than 12 wt %, preferably no more than 10 wt %, preferably no more than 8 wt %, preferably no more than 7 wt %. Preferably, the film comprises at least 55 wt % of the acrylic polymer blend, preferably at least 60 wt %, preferably at least 62 wt %; preferably no more than 80 wt %, preferably no more than 78 wt %. Preferably, the film comprises at least 12 wt % polyethylene oxide, preferably at least 14 wt %; preferably no more than 35 wt %, preferably no more than 30 wt %, preferably no more than 25 wt %, preferably no more than 22 wt %. Preferably, the film comprises from 1 to 15 wt % of a plasticizer; preferably at least 3 wt %, preferably at least 5 wt %; preferably no more than 12 wt %, preferably no more than 9 wt %. Preferred plasticizers include tris(2-butoxyethyl) phosphate, 1,4-butanediol, glycerol, propylene glycol, TEXANOL (2,2,4-trimethyl-1,3-pentanediol monoisobutyrate) or a combination thereof. Other ingredients of the film may include 0.1-1 wt % inorganic additives (talc, colloidal silica particles, also referred to as silica sols, which can be produced from different raw materials, e.g., from precipitated silica, micro silica (silica fume), pyrogenic silica (fumed silica) or silica gels, and they may be silanised) and 0.1-1 wt % antiblocking agents (zinc stearate, magnesium stearate, potassium oleate, sorbitan monooleate).

Preferably, the amount of polymerized units of multiethylenically unsaturated monomers in the polymer blend is no greater than 1 wt %, preferably no greater than 0.5 wt %, preferably no greater than 0.25 wt %, preferably no greater than 0.1 wt %, preferably no greater than 0.05 wt %; all percentages based on dry polymer.

The polymers may be prepared by conventional emulsion polymerization techniques well known in the art. Preferably, at least a portion of the carboxylic acid groups on the hard polymer or the soft polymer, or both the hard polymer and the soft polymer, are neutralized. The carboxylic acids may be neutralized by conventional techniques with at least one base. Preferred bases include, e.g., amines, alkali or alkaline earth metal hydroxides, ammonium hydroxide and combinations thereof. Suitable amine neutralizers include, for example, 2 amino-2-methyl-1,3-propanediol, 2-amino-2-methyl-1-propanol, N,N-dimethyl-2-amino-2-methyl-1-propanol, mono-isopropanolamine, triisopropanolamine, ethanolamine, triethanolamine and morpholine. Suitable alkali or alkaline earth metal hydroxides include, for example, sodium hydroxide and potassium hydroxide. Preferably, the neutralizer is selected from potassium hydroxide, sodium hydroxide, or mixtures thereof.

The amount of neutralizer added to the polymer is that amount needed to provide the desired level of neutralization, preferably from 95 to 110% of the amount which produces complete neutralization, preferably from 98 to 110%, preferably from 98 to 105%, preferably from 75 to 100%, preferably from 95 to 105%, based on molar equivalents, of the acid groups in the acrylic polymer blend are neutralized.

Preferably, the hard and soft polymers of the invention contain crystalline content. Preferably the crystallizable units (chains or sequences) of the semicrystalline polymers according to the invention are obtained from monomer(s) containing crystallizable sequence(s) or chain(s), used for the manufacture of the semicrystalline polymers. Examples of semicrystalline polymers or copolymers containing crystallizable chain(s) include those resulting from the polymerization of at least one monomer containing a crystallizable chain chosen from saturated $C_{12}$-$C_{24}$ alkyl (meth)acrylates. Preferred $C_{12}$-$C_{24}$ alkyl (meth)acrylates include dodecyl methacrylate (also known as lauryl methacrylate), tridecyl methacrylate, tetradecyl methacrylate (also known as myristyl methacrylate), pentadecyl methacrylate, dodecyl-pentadecyl methacrylate (DPMA), a mixture of linear and branched isomers of dodecyl, tridecyl, tetradecyl and pentadecyl methacrylates; and lauryl-myristyl methacrylate (LMA), a mixture of dodecyl and tetradecyl methacrylates, hexadecyl methacrylate, heptadecyl methacrylate, octadecyl methacrylate, nonadecyl methacrylate, cosyl methacrylate, eicosyl methacrylate, cetyl-eicosyl methacrylate (CEMA), a mixture of hexadecyl, octadecyl, cosyl and eicosyl methacrylate; and cetyl-stearyl methacrylate (SMA), and a mixture of hexadecyl and octadecyl methacrylate. . Percent crystallinity may be determined using differential scanning calorimetry. Percent crystallinity may be calculated by normalizing the heat of fusion of each sample to the known heat of fusion of a 100% crystalline reference standard.

Preferably, the pouch contains a detergent composition. Preferably, the detergent composition are compositions that are effective at inhibiting scale/spotting in warewash applications. The detergent composition of the invention also contains at least one inorganic base. Suitable inorganic bases include alkali metal carbonates and alkali metal hydroxides, such as sodium or potassium carbonate, bicarbonate, sesquicarbonate, sodium, lithium, or potassium hydroxide; preferably sodium hydroxide. Preferably, the composition contains at least 25 wt %, preferably at least 30 wt %, preferably at least 35 wt % of the alkaline source, based on the total weight of the composition; preferably, no more than 70 wt %, preferably no more than 65 wt %, preferably no more than 60 wt %, preferably no more than 55 wt %. Preferably, the detergent composition contains from 0.5 to 12 weight percent of a water soluble dispersant polymer, preferably from 1 to 10 wt %, preferably from 1.5 to 8 wt %, based on the total weight of the composition. Preferably, the total amount of surfactants is from 0.5 wt % to 8 wt %, preferably at least 0.7 wt %, preferably at least 0.9 wt %; preferably no more than 7 wt %, preferably no more than 6 wt %, preferably no more than 5 wt %, preferably no more than 4 wt %.

Surfactants may be anionic, cationic, or nonionic; preferably nonionic. Preferred nonionic surfactants include, without limitation, alkoxylate surfactants, particularly those based on ethylene oxide, propylene oxide, and/or butylene oxide. Preferred nonionic surfactants include compounds having the formula RO-$(M)_x$-$(N)_n$—OH or R—O-$(M)_x$-$(N)_y$—O—R' in which M and N are units derived from alkylene oxides (of which one is ethylene oxide), x and y are integers from 0 to 20, provided at least one of them is not zero, R represents a $C_6$-$C_{22}$ linear or branched alkyl group, and R' represents a group derived from the reaction of an alcohol precursor with a $C_6$- $C_{22}$ linear or branched alkyl halide, epoxyalkane or glycidyl ether. In a preferred embodiment, M is derived from ethylene oxide and N is derived from butylene oxide.

Preferably, the composition comprises at least 25 wt % water, preferably at least 30 wt %, preferably at least 40 wt %; preferably no more than 75 wt %, preferably no more than 70 wt %, preferably no more than 65 wt %, preferably no more than 60 wt %, preferably no more than 55 wt %.

The composition may contain other optional components, for instance, oxygen and/or chlorine bleaches, bleach activators, enzymes, foam suppressants, colors, fragrances, builders, antibacterial agents and fillers. Fillers in tablets or powders are inert, water- soluble substances, typically sodium or potassium salts, e.g., sodium or potassium sulfate and/or chloride, and typically are present in amounts ranging from 0 wt % to 70 wt %, preferably 0 to 50 wt %.

Fillers in gel formulations may include those mentioned above and also water. Fragrances, dyes, foam suppressants, enzymes and antibacterial agents usually total no more than 5 wt % of the composition.

The detergent composition can be used under typical operating conditions. Preferably, when used in an automatic warewashing machine, typical water temperatures during the washing process preferably are from 60° C. to 75° C. and typical rinse water temperatures during the rinse process preferably are from 75° C. to 88° C. Typical concentrations for the composition are from 500 to 2000 ppm in the wash liquor. With selection of an appropriate product form and addition time, the composition may be present in the prewash, main wash, penultimate rinse, final rinse, or any combination of these cycles.

EXAMPLES

The unit dose film composition of the present invention is explained more in detail by means of the examples below, though it is not meant to be limited to, or by them.

Example 1-12

1.1 Synthesis of Emulsion Precursors: Polymers 1-6

Polymer 1-6 are acrylic emulsion polymers prepared by emulsion polymerizing of various monomers to obtain a latex composition having 40-44% solids. The following monomer abbreviations listed in Table 1 are used in giving polymer composition:

TABLE 1

List of Monomers

| | | |
|---|---|---|
| AA | (Acrylic acid), Monomer | Dow Chemical |
| BA | (Butyl acrylate), Monomer | Dow Chemical |
| EA | (Ethyl acrylate), Monomer | Acros Organics USA |
| HEA | (2-hydroxy ethyl acrylate), Monomer | Dow Chemical |
| HEMA | (2-hydroxy ethyl methacrylate), Monomer | BYK, USA Inc |
| MMA | (Methyl methacrylate), Monomer | Sigma Aldrich, St. Louis, MO |
| MAA | (Methacrylic acid), Monomer | Alfa Aesar |
| PEGMA | (Polyethylene Glycol Methyl Ether Methacrylate), Mw 500 | Alfa Aesar |
| SMA | (Stearyl Methacrylate), Monomer | Alfa Aesar |
| QM-833 | Monomer | The Dow Chemical |

Polymer 1

The emulsion polymerization procedure which was used to make the polymers is as follows:

To a three liter round bottom flask, equipped with a mechanical stirrer, heating mantle, thermocouple, condenser and inlets for the addition of monomer, initiator and nitrogen was charged 430.1 grams deionized water. The mixture was set to stir with a nitrogen flow and heated to 87-89° C. A surfactant kettle charge of 4.76 grams of RHODAFAC RS-610A25 ($NH_4+$ salt) was added to a vial and set aside. A kettle inhibitor solution of 0.15 grams of actrene dissolved in 4 grams of deionized water was added to a vial and set aside. A kettle initiator solution of 1.03 grams of ammonium persulfate dissolved in 14.9 grams of deionized water was placed in vial and set aside.

To a plastic lined vessel Monomer Emulsion Mix #1 was prepared. 64.23 grams deionized water was added and mixed with overhead stirring. To that a slurry of 6.78 grams of benzoic acid, 12.71 grams Rhodafac RS-610A25 and 25 grams of deionized water was then added.

To a beaker, 79.43 grams of butyl acrylate and 1.2 grams of dodecanethiol was mixed and added to the vessel followed by 37.5 grams of deionized water. 198.58 grams of ethyl acrylate followed by 12.5 grams of deionized water was added. 19.84 grams of polyethylene glycol methyl ether methacrylate, $M_n$ 500 followed by 12.5 grams of deionized water was added. 59.57 grams of hydroxyethyl methacrylate followed by 12.5 grams of deionized water was added. And finally 39.71 grams of glacial methacrylic acid followed by 12.5 grams of deionized water was added and mixed until creamy. A cofeed catalyst solution of 1.01 grams ammonium persulfate dissolved in 119.1 grams deionized water was added to a syringe.

When the kettle contents reached reaction temperature of 87-89° C., the kettle inhibitor solution was added with 5 grams deionized water rinse, followed by the surfactant kettle charge and 5 grams of deionized water rinse. With the reactor temperature at 83-85° C., 47.97 grams of the monomer emulsion mix was added, immediately followed by the kettle initiator solution and 5 grams of deionized water rinse. An expected exotherm begins within 2 minutes and peaks in ~5 minutes. After the peak exotherm was achieved, the Monomer Emulsion Mix #1 was added at a rate of 13.7 grams per minute for 40 mins. Simultaneously, the cofeed catalyst solution was added at a rate of 1.09 grams per minute. The temperature was allowed to reach 86° C. during the feed. When the Monomer Mix #1 was completed in 40 minutes, the cofeed catalyst solution was stopped. With the reaction temperature being maintained at 84-86° C. During the hold period, 22.4 grams of methyl cyclodextrin (50% solution) was added to the kettle. Then Monomer Emulsion Mix #2 was prepared.

To a plastic lined vessel Monomer Emulsion Mix #2 was prepared Monomer Emulsion Mix #2 was prepared. 165.5 grams deionized water was added and mixed with overhead stirring. To that a slurry of 10.28 grams of benzoic acid, 19.04 grams Rhodafac RS-610A25 and 25 grams of deionized water was then added.

To a beaker, 147.4 grams of butyl acrylate and 1.74 grams of dodecanethiol was mixed and added to the vessel followed by 37.5 grams of deionized water. 218.13 grams of methyl methacrylate followed by 12.5 grams of deionized water was added. 58.95 grams of stearyl methacrylate followed by 12.5 grams of deionized water was added. 58.95 grams of hydroxyethyl acrylate followed by 12.5 grams of deionized water was added. Finally, 106.11 grams of glacial methacrylic acid followed by 12.5 grams of deionized water was added and mixed until creamy.

When the Monomer Emulsion Mix #2 was completed, the feeds were resumed. Mix #2 was added at a rate of 15 grams per minute for 60 minutes and the cofeed catalyst solution was restarted and the rate was maintained at 1.09 grams per minute which resulted in a 10 minute overfeed. 32.5 grams of deionized water was added to the monomer vessel as a rinse and 25 grams of deionized water was added to the catalyst syringe as a rinse.

In the meantime, chaser catalyst and activator solutions #1 were prepared. 0.015 grams of ferrous sulfate heptahydrate was added to a vial with 10 grams of deionized water to dissolve. A reactor chase catalyst solution was prepared by adding of 1.39 grams of 70% tert-butyl hydroperoxide in 19.9 grams of deionized water and a reactor chaser activator solution of 1.02 grams of Bruggolite FF-6 was dissolved in 19.9 grams of deionized water, both added to separate syringes for addition to the reactor.

When the kettle rinses were completed, the chaser promoter solution was added to the kettle and the chaser activator and catalyst solutions #1 were added over a rate of 0.47 grams per minute over 50 minutes. After 30 minutes, begin to cool the batch to 75° C. Holding the reaction for 10 minutes at 75° C. after the completion of solutions #1.

During the hold, chaser catalyst and activator solutions #2 were prepared. A reactor chase catalyst solution was prepared by adding of 0.69 grams of 70% tert-butyl hydroperoxide in 19.9 grams of deionized water and a reactor chaser activator solution of 0.49 grams of Bruggolite FF-6 was dissolved in 19.9 grams of deionized water, both added to separate syringes for addition to the reactor.

At the end of chaser #1 hold, 25 grams of deionized water was added as a reactor rinse. Cooling was immediately started and chaser solutions #2 were started at a rate of 0.57 grams per minute over 40 minutes. With no temperature input to the reactor the temperature drifted to 55° C. by end of the feeds. 5 grams of deionized water were added to each of the syringes for rinsing to the kettle. The batch was then held at 53-55° C. for 10 minutes. Then cooled to room temperature and filtered through 100 mesh screen.

The resultant emulsion had final solids of 44.4% and a pH of 3.47. Overall gels were 3000 ppm and a particle size of 148 nm. Residual BA, EA and MMA were all <2 ppm. Molecular weight was 128170.

Polymer 2

The acrylic emulsion composition of Polymer 2 was prepared in a similar manner to Polymer 1 except that the amount of MMA in Monomer Emulsion Mix #2 was increased to 259.42 g while the amount of SMA was decreased to 17.68 g.

Polymer 3

The acrylic emulsion composition of Polymer 3 does not contain SMA or HEA. It was prepared in a similar manner to Polymer 1 except the following changes in Monomer Emulsion Mix #2; MMA was increased to 277.09 g, and MAA was reduced to 76.64 g.

Polymer 4

The acrylic emulsion composition of Polymer 4 contain IBMA instead of SMA. It was prepared in a similar manner to Polymer 1 except the following changes in Monomer Emulsion Mix #2; MMA was replaced with IBMA 277.09 g.

Polymer 5

The acrylic emulsion composition of Polymer 5 does not contain PEGMA or HEMA. Instead a new polymerizable monomer QM-833 was used. It was prepared in a similar manner to Polymer 1 except the following changes in Monomer Emulsion Mix #1: PEGMA was removed and replaced with QM-833 in both Monomer Emulsion Mix #1 28.35 g and Monomer Emulsion Mix #2 42.10 g In addition, HEMA in Monomer Emulsion Mix #1 was replaced with HEA 59.57 g.

Polymer 6

The acrylic emulsion composition of Polymer 6 is similar to Polymer 3 except it does not contain PEGMA. Instead a new polymerizable monomer QM-833 was used. It was prepared in a similar manner to Polymer C except the following changes in Monomer Emulsion Mix #1: PEGMA was removed and replaced with QM-833 in both Monomer Emulsion Mix #1 28.37 g and Monomer Emulsion Mix #2 42.1 g.

TABLE 2

List of Monomers

| | Polymer | | | | | |
|---|---|---|---|---|---|---|
| | 1 | 2 | 3 | 4 | 5 | 6 |
| Monomer Mix 1 | | | | | | |
| BA | 20 | 20 | 20 | 20 | 20 | 20 |
| EA | 50 | 50 | 50 | 50 | 50 | 50 |
| HEA | 0 | 0 | 0 | 15 | 15 | 0 |
| HEMA | 15 | 15 | 15 | 0 | 0 | 15 |
| PEGMA | 5 | 5 | 5 | 5 | 0 | 0 |
| QM-833 | 0 | 0 | 0 | 0 | 5 | 5 |
| MAA | 10 | 10 | 10 | 10 | 10 | 10 |
| TOTAL | 100 | 100 | 100 | 100 | 100 | 100 |
| Monomer Mix 2 | | | | | | |
| BA | 25 | 25 | 25 | 25 | 25 | 25 |
| HEA | 10 | 10 | 0 | 0 | 0 | 0 |
| HEMA | 0 | 0 | 10 | 10 | 10 | 10 |
| PEGMA | 0 | 0 | 5 | 5 | 0 | 0 |
| QM-833 | 0 | 0 | 0 | 0 | 5 | 5 |
| MAA | 18 | 18 | 13 | 13 | 13 | 13 |
| IBMA | 0 | 0 | 0 | 47 | 37 | 47 |
| MMA | 37 | 44 | 47 | 0 | 0 | 0 |
| SMA | 10 | 3 | 0 | 0 | 10 | 0 |
| TOTAL | 100 | 100 | 100 | 100 | 100 | 100 |

TABLE 3

Properties of Acrylic Emulsion Polymers

| | Polymer | | | | | |
|---|---|---|---|---|---|---|
| | 1 | 2 | 3 | 4 | 5 | 6 |
| Solids | 44.40 | 44.95 | 44.00 | 44.80 | 43.80 | 45.70 |
| pH | 3.47 | 3.38 | 3.68 | 3.57 | 3.49 | 3.49 |
| Acid No. | 1.82 | 1.80 | 1.53 | 1.49 | 1.54 | 1.36 |
| Viscosity | 29.0 | 35.0 | 31.0 | 44.0 | 29.0 | 10 |
| $T_g$, °C. | Tg1~6-7; Tm~28; Tg3~45-54 | Tg1~6-9; Tm~29; Tg3~44-54 | Tg1~8-9; Tg2~50-58 | Tg1~-2; Tg2~32-38 | Tg1~-1 Tm~26; Tg2~41-42; | Tg1~5-6; Tg2~57-65 |
| $M_w$ | 128170 | 117640 | 138690 | 147720 | 130570 | 102530 |
| $M_n$ | 45879 | 14842 | 49379 | 50508 | 50420 | 46016 |

1.2 Preparation of Aqueous Dispersions of the Water-Soluble Films

Using the copolymers of Table 3, film formulations of Example 1-17 were prepared by mixing together the components in the weight proportions listed in TABLES 4-6.

TABLE 4

Water Soluble Films

| Ingredients | F1 | F2 | F3 | F4 | F5 |
|---|---|---|---|---|---|
| Polymer 1 | 80.80 | 74.10 | | | |
| Polymer 2 | | | 74.20 | | |
| Polymer 3 | | | | 80.20 | 65.00 |
| Polymer 7 | | | | | 10.10 |
| Polymer 8 | 17.40 | 17.50 | 17.50 | 17.62 | 17.57 |
| Polymer 9 | | | 5.00 | | |
| Polymer 10 | | 4.90 | | | |
| Plasticizer 1 | | | | | |
| Additive 1 | 0.10 | 1.00 | 1.00 | 0.10 | 1.01 |
| Additive 2 | | | | | |
| Additive 3 | 0.03 | 0.35 | 0.34 | 0.04 | 0.35 |
| Additive 4 | 0.02 | 0.17 | 0.17 | 0.02 | 0.17 |
| Additive 5 | 0.96 | 1.09 | 0.99 | 1.10 | 4.98 |
| Additive 6 | 0.76 | 0.89 | 0.80 | 0.92 | 0.89 |
| Total | 100 | 100 | 100 | 100 | 100 |

Polymer 7 - ACUDYNE ™ 180 acrylic emulsion polymer with a weight average molecular weight of 90,000 Daltons available from The Dow Chemical Company
Polymer 8 - POLYOX ™ WSR 205 poly(ethylene oxide) with a weight average molecular weight of 600,000 Daltons available from The Dow Chemical Company
Polymer 9 - Poly(vinyl pyrrolidone) with a weight average molecular weight of 1,300,000 Daltons commercially available from Acros Organics
Polymer 10 - Poly(vinyl pyrrolidone) with a weight average molecular weight of 29,000 Daltons commercially available from Acros Organics
Plasticizer 1 - Tributoxyethyl phosphate commercially available from BYK-Gardner, USA
Additive 1 - Magnesium stearate commercially available from Sigma Aldrich
Additive 2 - Potassium stearate commercially available from Fisher Scientific
Additive 3 - Potassium oleate commercially available from Alfa Aesar
Additive 4 - Sorbitan Monooleate (SPAN ®80) commercially available from Alfa Aesar
Additive 5 - Bindzil CC401, which is a silane modified colloidal silical, commercially available from AkzoNobel
Additive 6 - FoamStar ® A34 defoamer, commercially available from Cognis

TABLE 5

Water Soluble Films

| Ingredients | F6 | F7 | F8 | F9 | F10 | F11 |
|---|---|---|---|---|---|---|
| Polymer 3 | 68.6 | | | | | |
| Polymer 4 | | | 69.6 | | | |
| Polymer 5 | | | | 80.59 | 73.1 | 64.9 |
| Polymer 6 | | 79.1 | | | | |
| Polymer 7 | | | | | | 10 |
| Polymer 8 | 17.5 | 17.5 | 17.6 | 17.5 | 17.5 | 17.6 |
| Polymer 9 | | | | | | |
| Polymer 10 | 10.4 | | | | | |
| Plasticizer 1 | | | 9.9 | | | |
| Additive 1 | 1.05 | 0.99 | | | 5.01 | 1 |
| Additive 2 | | | 1.02 | | | |
| Additive 3 | 0.37 | 0.34 | | | 1.73 | 0.35 |
| Additive 4 | 0.18 | 0.17 | | | 0.82 | 0.17 |
| Additive 5 | 1.1 | 1.01 | 1.08 | 1.03 | 0.97 | 5.06 |
| Additive 6 | 0.82 | 0.85 | 0.75 | 0.89 | 0.91 | 0.89 |
| Total | 100 | 100 | 100 | 100 | 100 | 100 |

Polymer 7 - ACUDYNE ™ 180 acrylic emulsion polymer with a weight average molecular weight of 90,000 Daltons available from The Dow Chemical Company
Polymer 8 - POLYOX ™ WSR 205 poly(ethylene oxide) with a weight average molecular weight of 600,000 Daltons available from The Dow Chemical Company
Polymer 9 - Poly(vinyl pyrrolidone) with a weight average molecular weight of 1,300,000 Daltons commercially available from Acros Organics
Polymer10 - Poly(vinyl pyrrolidone) with a weight average molecular weight of 29,000 Daltons commercially available from Acros Organics
Plasticizer 1 - Tributoxyethyl phosphate commercially available from BYK-Gardner, USA
Additive 1 - Magnesium stearate commercially available from Sigma Aldrich
Additive 2 - Potassium stearate commercially available from Fisher Scientific
Additive 3 - Potassium oleate commercially available from Alfa Aesar
Additive 4 - SPAN 80, Sorbitan Monooleate commercially available from Alfa Aesar
Additive 5 - BINDZIL CC401, which is a silane modified colloidal silical, commercially available from AkzoNobel
Additive 6 - FoamStar ™ A34 defoamer, commercially available from Cognis

TABLE 6

Water soluble film formulations

| Ingredients | | F12 | F13 | F14 | F15 | F16 | F17 |
|---|---|---|---|---|---|---|---|
| Polymer 2 | | 74.8 | 67.0 | 67.0 | 69.6 | 68.5 | 67.2 |
| Polymer 8 | POLYOX 205 | 17.5 | 17.6 | 17.6 | 17.6 | 18.0 | 17.5 |
| Polymer 9 | PVP K85-95 | 5.0 | 5.0 | 5.0 | 5.0 | 5.1 | 5.1 |
| Polymer 10 | Luviskol K90 | | | | | 5.1 | |
| Plasticizer 1 | TBEP | | 5.0 | 5.0 | | | 7.1 |
| Plasticizer 2 | 1,4-Butanediol | | 2.2 | | 4.0 | | |
| Plasticizer 3 | Texanol | | | 2.2 | 0.0 | 0.0 | |
| Additive 1 | Mg Stearate | 1.12 | 0.99 | 0.99 | 0.98 | 1.01 | 1.05 |
| Additive 2 | K Stearate | | | | | | |
| Additive 3 | K Oleate | 0.39 | 0.34 | 0.34 | 0.34 | 0.35 | 0.36 |
| Additive 4 | SPAN 80, Sorb mOleat | 0.17 | 0.17 | 0.17 | 0.17 | 0.17 | 0.18 |
| Additive 5 | Silica - BINDZIL | 0.24 | 0.96 | 0.96 | 1.00 | 0.98 | |
| Additive 6 | FoamStar | 0.80 | 0.79 | 0.79 | 1.40 | 0.81 | 0.97 |

TABLE 6-continued

Water soluble film formulations

| | Ingredients | F12 | F13 | F14 | F15 | F16 | F17 |
|---|---|---|---|---|---|---|---|
| Additive 7 | Talc | | | | | | 0.52 |
| | Total | 100.0 | 100.0 | 100.0 | 100.0 | 100.0 | 100.0 |

Polymer 8 - Polyox WSR 205 poly(ethylene oxide) with a weight average molecular weight of 600,000 Daltons available from The Dow Chemical Company
Polymer 9 - Poly(vinyl pyrrolidone) with a weight average molecular weight of 1,300,000 Daltons commercially available from Acros Organics
Polymer 10 - Poly(vinyl pyrrolidone) with a weight average molecular weight of 29,000 Daltons commercially available from Acros Organics
Plasticizer 1 - Tributoxyethyl phosphate commercially available from BYK-Gardner, USA
Plasticizer 2 - 1,4 butanediol (100%) plasticizer available from Alfa Aesar
Plasticizer 3 - Texanol ™ from Eastman Chemical Company
Additive 1 - Magnesium stearate commercially available from Sigma Aldrich
Additive 2 - Potassium stearate commercially available from Fisher Scientific
Additive 3 - Potassium oleate commercially available from Alfa Aesar
Additive 4 - SPAN 80, Sorbitan Monooleate commercially available from Alfa Aesar
Additive 5 - BINDZIL CC401, which is a silane modified colloidal silical, commercially available from AlczoNobel
Additive 6 - FoamStarTM A34 defoamer, commercially available from Cognis
Additive 7 - Talc powder, commercially available from Fisher Scientific A typical procedure involves:
A. Preparation of Magnesium Stearate Dispersion (Additive 1)

The magnesium stearate dispersion is a 15 wt % aqueous dispersion of magnesium stearate (Fisher Scientific), potassium oleate (Fisher Scientific) and sorbitan monooleate (Span 80, Fisher). The dispersion was prepared by mixing in an 8 ounce jar 1.73 g of potassium oleate, 0.85g of sorbitan monooleate, 5.0 g of magnesium stearate and 41.9 g of deionized water. The mixture was stirred using a magnetic stir bar for 15 minutes. The final dispersion has a solid content of 15.3% and contains 3.5 wt % of potassium oleate, 1.7 wt % of sorbitan monooleate, 10.1 wt % of magnesium stearate and 84.7 wt % of deionized water.

B. Preparation of Aqueous Film Formulations
1. Prepare 6.0 wt % of Polymer 8 solution in deionize water
2. Prepare 20 wt % of Polymer 9 solution in deionize water
3. Into a mixing tank equipped with a mechanical stirrer, add Polymer 8 solution
4. Add POLYMER 9 to the mixing tank slowly over 10 minutes
5. Add ADDITIVE 6
6. Add appropriate acrylic emulsion polymer (Polymer 1-7) to the mixing tank slowly over 20 minutes
7. Hold for 10 minutes
8. Add ADDITIVE 5 over 5 minutes
9. Hold for 10 minutes
10. Adjust pH to 8-9 using 12 wt % NaOH solution over 20 minutes: (Solution becomes clear once fully neutralized)
11. Hold for 10 minutes
12. Add ADDITIVE 1 over 5 minutes
13. Hold for 10 minutes
14. Add other additives if needed, hold
15. Deaerate using a flacktek SpeedMixers™ equipment at 2400 rpm for 2 minutes Aqueous Film Casting A film was prepared in each of Examples 1-17 by casting 15 to 25 grams of the film forming composition of F1-F11 onto a polyethylene terephthalate substrate using a stainless steel draw down bar to form a dried film with a target thickness of 76 μm. The drawn films were immediately transferred to a forced air oven and dried at 65-95° C. for 10 to 15 minutes to form a dried film. The dried films were then removed from the oven and left to equilibrate to room temperature for several hours. Once the films were equilibrated to room temperature, the films were released from the polyethylene terephthalate substrate to provide free standing films 60 to 90 μm thick. It is typical to place the films between two sheets of silicon coated release liner paper and store in a Controlled Temperature Room (CTR) at ambient temperature and at least 50% relative humidity.

Cold Water Solubility Testing

Thin film strips measuring 0.5 inch wide and 1.5 inch long were placed in 20 ml of tap water. The films were allowed to sit undisturbed for approximately 2 mins and then shaken for 60 seconds by hand. The dissolved/dispersed film mixture was then filtered using a 25 micron mesh screen. The following rating scale based on residue on the screen was then used to characterize the overall cold water solubility:

5=Clear solution, no residue; 4=Cloudy solution or dispersion, no residue; 3=fine grit; 2=large amount of grit/residue; 1=Film fragment; 0=Intact/did not break.

TABLE 7

Dissolution Properties and High Water Detergent Stability Testing

| Example | Cold Water Dissolution (150 ppm) |
|---|---|
| C1 | 5 |
| F1 | 4 |
| F2 | 4 |
| F3 | 4 |
| F4 | 3 |
| F5 | 4 |
| F6 | 4 |
| F7 | 1 |
| F8 | 2 |
| F9 | 3 |
| F10 | 2 |
| F11 | 4 |
| F12 | 4 |
| F13 | 4 |
| F14 | 4 |
| F15 | 4 |
| F16 | 4 |
| F17 | 4 |

Comparative 1 (C1) is MONOSOL ™ M8630 modified polyvinyl hydroxide film available from MonoSol LLC Mechanical Properties The mechanical properties were measured using a Tinius Olsen Model H10K-S. Rectangular strips 3.0 inch×0.5 inch in size were used. The tensile testing was performed according to ASTM D882 using a 1.2 inch gauge length at a test speed of 20 inch/min at ambient conditions in a controlled temperature and humidity room with a temperature and humidity at 71° F. (22° C.) and 53% relative humidity.

Storage Stability Testing

The storage stability of the films was determined by physically examining the films for brittleness and stickiness or residue after storing at ambient temperatures 68-72° F. and low and high relative humidity. Low humidity storage conditions refers to films stored at 18-23% relative humidity room while high humidity storage conditions refers to films stored at 68-70% relative humidity room. A pass/fail rating scale was used wherein:

Pass=film maintains toughness and flexibility after 1 month storage.

Fail=film becomes brittle after 1 month storage.

pouches were then evaluated for any signs of film failure. The results of the observations are provided in TABLE 10.

Unit Dose Pouch Water Solubility/Dispersibility

Following the 14 day storage, each unit dose pouch was placed into a 1 L bottle filled with tap water. The contents of the 1 L bottle were then agitated with a stir bar for a period of 30 minutes and then evaluated for pouch solubility by filtering the bottle contents through a 25 µm mesh screen. The following rating scale based on observation of the bottle contents pre-filtering and of the residue on the mesh screen was used to characterize the overall cold water solubility for the subject free standing films.

Excellent=Clear solution, no residue on screen

Very Good=Slight haze, no residue on screen

Good 32 low residue/fine grit on screen

Fair=large amount of residue/grit on screen

Poor=large intact film fragments on screen

The results of the observations are provided in TABLE 10.

TABLE 8

Mechanical Properties of Water soluble films

| | Example | | | | | | | | | |
|---|---|---|---|---|---|---|---|---|---|---|
| | FCI | F1 | F2 | F3 | F4 | F5 | F6 | F7 | F9 | F10 |
| Modulus | 17.0 | 114 | 94.5 | 72.0 | 70.9 | 84.1 | 153 | 124 | 23.2 | 79.1 |
| Tensile Stress @ 100% Elongation | 8.5 | 6.3 | 5.9 | 7.9 | 5.0 | 6.8 | 6.9 | 6.0 | 3.2 | 3.6 |
| Tensile Stress @ 300% Elongation | 11 | 7.3 | 6.5 | 8.2 | 7.0 | 7.1 | 8.1 | 6.4 | 3.2 | 4.0 |
| % Elongation | 856 | 501 | 647 | 679 | 387 | 376 | 485 | 542 | 943 | 762 |
| Break Stress (mPa) | 40.1 | 9.3 | 8.6 | 11.7 | 8.1 | 7.9 | 9.5 | 8.1 | 5.2 | 5.5 |
| 68° F./70% RH | Pass | Pass | Pass | Pass | Pass | Pass | Pass | Pass | Pass | Pass |
| 68° F./18% RH | Pass | Pass | Pass | Pass | Fail | Fail | Fail | Fail | Pass | Pass |

TABLE 9

Mechanical Properties of Water soluble films

| | Example | | | | | | |
|---|---|---|---|---|---|---|---|
| | 11 | 12 | 13 | 14 | 15 | 16 | 17 |
| Modulus | 48.2 | 131 | 49 | 57 | 58 | 51 | 45 |
| Tensile Stress @ 100% Elongation | 4.4 | 7.3 | 4.7 | 4.7 | 4.8 | 4.7 | 4.9 |
| Tensile Stress @ 300% Elongation | 4.7 | 7.9 | 6.3 | 5.5 | 5.4 | 5.2 | 6.6 |
| % Elongation | 851 | 418 | 551 | 518 | 566 | 624 | 501 |
| Break Stress (mPa) | 6.5 | 8.6 | 9.3 | 7.6 | 8.4 | 8.6 | 8.1 |
| 20° C./70% RH | Pass | Pass | Pass | Pass | Pass | Pass | Pass |
| 20° C./18% RH | Fail | Pass | Pass | Pass | Pass | Pass | Pass |

Unit Dose Detergent Pouch Stability Testing
content:

Unit Dose Pouches

In each of Examples P12-P17 the unit dose pouch was prepared manually from two film pieces cut to 3 inch ×2 inch from a film having the film composition noted in TABLE 9. The film pieces were stacked and heat sealed together along three edges to form an open pouch. The open pouch was then filled with 20 g of detergent. Then the fourth (open) edge of the pouch was then heat sealed to form the completed unit does pouch.

Unit Dose Pouch Accelerated High Temp. Low Humidity Storage Stability

The unit does pouches were stored in a 68° F. and 50% relative humidity environment for 4-7 weeks. The unit dose

TABLE 10

Chemical Resistance and Storage Stability Testing of Unit Dose Pouches

| Unit Dose Pouch | Film Composition | Alkaline Sample | # of Weeks | Chemical Resistance | Yellowing | Mechanical Integrity | Dissolution after storage |
|---|---|---|---|---|---|---|---|
| PC1 | FCI | 50% NaOH | 7 weeks | Poor | Significant | Poor | 4 |
| PC2 | FCI | 100% NaOH | 4 weeks | Fair | Small | Fair | 4 |
| P12 | F12 | 50% NaOH | 7 weeks | Exc | None | Fair | 4 |
| P13 | F13 | 50% NaOH | 7 weeks | Exc | None | Fair | 3 |
| P14 | F14 | 50% NaOH | 7 weeks | Exc | None | Fair | 4 |
| P15 | F15 | 50% NaOH | 7 weeks | Exc | None | Fair | 4 |
| P16 | F16 | 50% NaOH | 7 weeks | Exc | None | Good | 4 |
| P17 | F17 | 100% NaOH | 4 weeks | Exc | None | Good | 3 |

3.0 Results and Discussion

Table 3 lists properties of the acrylic emulsion polymers 1-6. Table 4-6 lists the formulation details for Examples F1-17 which are water-soluble films of the invention, prepared using Polymers 1 to 6 and formulated to include various plasticizers and additives to improve the mechanical properties of the films.

Table 7 lists the cold water dissolution properties of the films. The data from Table 7 show that a number of water soluble film compositions, notably, Examples F1, F2, F3, F5, F6 and F11-F17 have very good cold water dissolution properties.

Table 8-9 lists the mechanical properties of the water soluble films. The results show that the water soluble films of Example 1, 2, 3, 9, 10, 12-17, possess acceptable film strength and toughness to enable packaging. The results further show that films of examples 1, 2, 3, 9, 10, 12-17 are stable when stored at ambient temperatures and low and high relative humidity, specifically 68° F. (20° C.) and 18% RH Table 8 lists compositions of water soluble films suitable for packaging solid and liquid caustic and highly alkaline compounds, specifically 50% NaOH (in water) and 100% active NaOH pellets.

Table 9 shows that all pouches of the tested films of Example 12-17 exhibited excellent chemical resistant and stability to both liquid and solid NaOH compared to the control film which was significant attacked and degraded. All the films of the Examples 12-17 show no yellowing. Pouches based on films of Example 12-15 remained intact but shows signs of embrittlement after 4-7 weeks storage. Examples 16 and 17 were found to provide a favorable combination of chemical resistance and stability upon packaging 50% NaOH and 100% NaOH for 4-7 weeks. In particular, the pouch of Example 16 maintained cold water solubility after 7 weeks while Example 17 remained soluble but displayed minimal grit but it is still considered acceptable.

Table 10 show the images of the pouches containing solid and liquid NaOH after 4-7 weeks of storage at 68° F. (20° C.)/70% RH.

The invention claimed is:

1. A water soluble film; said water soluble film comprising:
   (a) 50 to 85 wt %, based on weight of said film, of an acrylic polymer blend comprising:
   (i) 40 to 67 wt %, based on weight of said blend, of a hard polymer with a glass transition temperature ("$T_g$") from 40 to 70° C. and comprising polymerized units of: 30 to 60 wt % of $C_1$-$C_7$ alkyl methacrylate monomers; 10 to 40 wt % of (meth)acrylic acid monomer; and 4 to 22 wt % of least one $C_2$-$C_4$ hydroxyalkyl (meth)acrylate, based on total weight of the hard polymer; and
   (ii) 33 to 60 wt %, based on weight of said blend, of a soft polymer with a $T_g$ from −20 to 20° C. and comprising polymerized units of: 55 to 85 wt % of $C_{1-4}$ alkyl acrylate monomers; 5 to 30 wt % of at least one $C_3$-$C_8$ monoethylenically unsaturated monocarboxylic acid monomer or ethylenically unsaturated dicarboxylic acid monomer; and 0 to 25 wt % of at least one hydroxyalkyl (meth)acrylate, based on total weight of the soft polymer;
   wherein Tg of the hard polymer minus Tg of the soft polymer is at least 30° C., and wherein at least a portion of the carboxylic acid groups on the hard polymer or the soft polymer, or both the hard polymer and the soft polymer, are neutralized; and
   (iii) 0 to 10 wt %, based on weight of said blend, of at least one ($C_{12}$-$C_{24}$)alkyl (meth)acrylate polymer comprising crystallizable side chains with $T_m$ from 0° C. to 37° C.;
   (b) 10 to 40 wt %, based on weight of said film, of a polyethylene oxide having $M_w$ from 250,000 to 4,000,000; and
   (c) 2 to 10 wt %, based on weight of said film, of a poly(vinylpyrrolidone) having $M_w$ from 500,000 to 1,700,000.

2. The film of claim 1 in which the film comprises from 60 to 80 wt % of the acrylic polymer blend and from 12 to 30 wt % of the polyethylene oxide.

3. A detergent packet comprising a detergent formulation and a water soluble film;
   said detergent formulation comprising: (a) from 0 to 10 wt % surfactants; (b) from 3 to 25 wt % silicate salts; (c) from 20 to 80 wt % water; and (d) from 20 to 80 wt % of at least one inorganic base; and
   said water soluble film according to claim 1;
   wherein the water soluble film encases the detergent formulation.

* * * * *